United States Patent [19]

Veaux et al.

[11] Patent Number: 4,749,152
[45] Date of Patent: Jun. 7, 1988

[54] AIRCRAFT UNDERCARRIAGE OF TILTING-BEAM TYPE AND OF REDUCED BULK

[75] Inventors: Jacques Veaux, Chatillon; Michel Derrien, Versailles, both of France

[73] Assignee: Messier-Hispano-Bugatti, Montrouge, France

[21] Appl. No.: 43,752

[22] Filed: Apr. 29, 1987

[30] Foreign Application Priority Data

May 13, 1986 [FR] France .............................. 86 06817

[51] Int. Cl.⁴ .............................................. B64C 25/22
[52] U.S. Cl. ........................ 244/104 FP; 188/321.11; 267/64.26
[58] Field of Search ......... 244/102 R, 102 SS, 104 R, 244/104 FP; 188/321.11; 267/64.26

[56] References Cited

U.S. PATENT DOCUMENTS

| | | |
|---|---|---|
| 2,670,160 | 2/1954 | Neilson . |
| 2,967,682 | 1/1961 | Fullam et al. ................... 244/102 R |
| 3,056,598 | 10/1962 | Conway et al. .................. 267/64.26 |
| 3,653,682 | 4/1972 | Palmer et al. .................... 267/64.26 |
| 4,396,170 | 8/1983 | Turiot et al. .................. 244/104 FP |

FOREIGN PATENT DOCUMENTS

| | | |
|---|---|---|
| 1756287 | 5/1979 | Fed. Rep. of Germany . |
| 709340 | 5/1954 | United Kingdom . |
| 1510554 | 5/1978 | United Kingdom . |

Primary Examiner—Galen Barefoot
Attorney, Agent, or Firm—Gerald J. Ferguson, Jr.; Michael P. Hoffman; Michael J. Foycik, Jr.

[57] ABSTRACT

The present invention is concerned with tilting-beam undercarriages.

The undercarriage is characterized in that the shock absorber means (7) comprise a hollow cylinder (11) entered by a plunger stem (14) at its first end (12) and by a piston (18) at its second end, while the hollow cylinder (11) has a hinge member (22) onto which the beam (8) is hinged at a point C differing from the center of it and the piston (18) is connected to the beam at a point D differing from the point of hinge C.

8 Claims, 8 Drawing Sheets

AIRCRAFT UNDERCARRIAGE OF TILTING-BEAM TYPE AND OF REDUCED BULK

The object of the invention is an aircraft main undercarriage of bogie or tandem type having great length when the aircraft is in an elevated position and a reduced length on the one hand during the evolutions of the aircraft on the ground and on the other hand for its retraction inside the aircraft. The bogie or tandem type undercarriages already known comprise essentially a casing attached to the aircraft inside which is arranged a main shock absorber; a beam hinged at the centre of it to the bottom of the main shock absorber supports at one end front means of rolling and at the other end rear means of rolling. A shock absorber arranged between the centre of the beam and one of the means of rolling and which the specialists call the "pitch" shock absorber enables the movement of rotation of the beam to be controlled.

In the case of aircraft having a long fuselage the condition of taking off at the angle of maximum elevation calls for a great length of the main undercarriage. This length is greater than that which would be strictly necessary for preserving during the evolutions of the aircraft on the ground a sufficient distance (called the "safety clearance") between the aircraft and the ground.

This elongation of the main undercarriages involves an elongation of the front auxiliary undercarriage in order to preserve the correct trim (substantially horizontal) of the aircraft when it is rolling along the ground.

These elongations of the main and front auxiliary undercarriages involve on the one hand the increase of their housing inside the aircraft and on the other hand an increase in their masses.

Again, this type of main undercarriage employs two shock absorbers, one main shock absorber, and one pitch shock absorber.

The main aim of the invention consists in realising an undercarriage capable of having an increased length in the elevated position of the aircraft and capable of having a reduced length at the time when the aircraft is rolling along the ground and at the time of its housing inside the aircraft.

Another aim of the invention is to realise an undercarriage having one single shock absorber means which ensures a function of elastic recall, of absorption of energy and of control of the tilting of the beam, this shock absorber means having a threshold force capable of ensuring a sufficient safety clearance of the aircraft from the ground in the elevated position of the aircraft.

The object of the present invention is an aircraft undercarriage comprising a casing intended for being connected to the structure of the aircraft and inside which are arranged shock absorber means having one end to which is hinged a beam equipped at each end of it with means of rolling; in accordance with the invention the shock absorber means comprise essentially:

a hollow cylinder sliding inside the casing by a first end and projecting by a second end;

a plunger stem of cross-section St sliding at the first end of the hollow cylinder;

a piston of cross-section Sp sliding at the second end of the hollow cylinder, so that the latter, the plunger stem, the piston and as a variant, the casing define at least one closed chamber which is variable as a function of the displacements of the plunger stem and of the piston, the chamber having at least one respective volume of compressible fluid cooperating with at least one respective volume of incompressible fluid in order to ensure the elastic function of the shock absorber means, means of throttling being arranged inside the chamber to ensure the shock absorbing function of the shock absorber means, whilst the second end of the hollow cylinder is provided with a hinge member comprising a hingepin at a point C situated beyond the said second end in the longitudinal direction, this pin serving for the hinging of the beam at a point differing from its centre, the beam being connected to the piston by a connecting rod hinged firstly to the said piston and secondly to the beam at a point D differing from the point of hinge.

The undercarriage in accordance with the invention has at the time of touch-down a first mode of operation (the lever mode) during which the beam pivots about its point of hinge under the effect of the contact of the rear means of rolling with the ground; the piston acts alone during this mode of operation. When all of the means of rolling have made contact with the ground, the undercarriage has a second mode of operation (the direct mode) during which the shock absorber means work in dependence upon the displacement of the hollow cylinder with respect to the plunger stem. During the course of rolling along the ground, the piston intervenes solely as a pitch shock absorber in order to control the pivoting or the pitch of the beam caused by the pitching movements of the aircraft or the roughnesses of the ground.

The particular arrangement of the plunger stem and of the piston entering a hollow cylinder at each end of it enable the advantages to be obtained of a single and compact shock absorber means.

During take-off the modes of operation of the undercarriage are reversed; the undercarriage passes from the direct mode to the lever mode. During this latter mode it is the rear means of rolling alone which support the aircraft. The shock absorber means because of a sufficient threshold force ensure a sufficient safety clearance of the aircraft from the ground during its elevated position. It will be understood that the undercarriage is advantageously elongated because the beam is not hinged at the centre of it but between the latter and the front means of rolling; this arrangement does not involve an increase in the housing inside the aircraft because the means of retraction make the beam come into a position substantially perpendicular to the longitudinal axis of the undercarriage.

Equally, when the front and rear means of rolling are in contact with the ground, the points of hinge of the beam and of the connecting rod connected to the piston may be arranged in such a way that an identical force may be obtained on the front and rear means of rolling as will be shown in detail later.

Other advantages will appear during the course of the description which follows of a preferred first embodiment and of a variant, of a second preferred embodiment of the invention and of a variant of the shock absorber means by way of non-restrictive examples by reference to the attached drawings in which.

Figure 1:
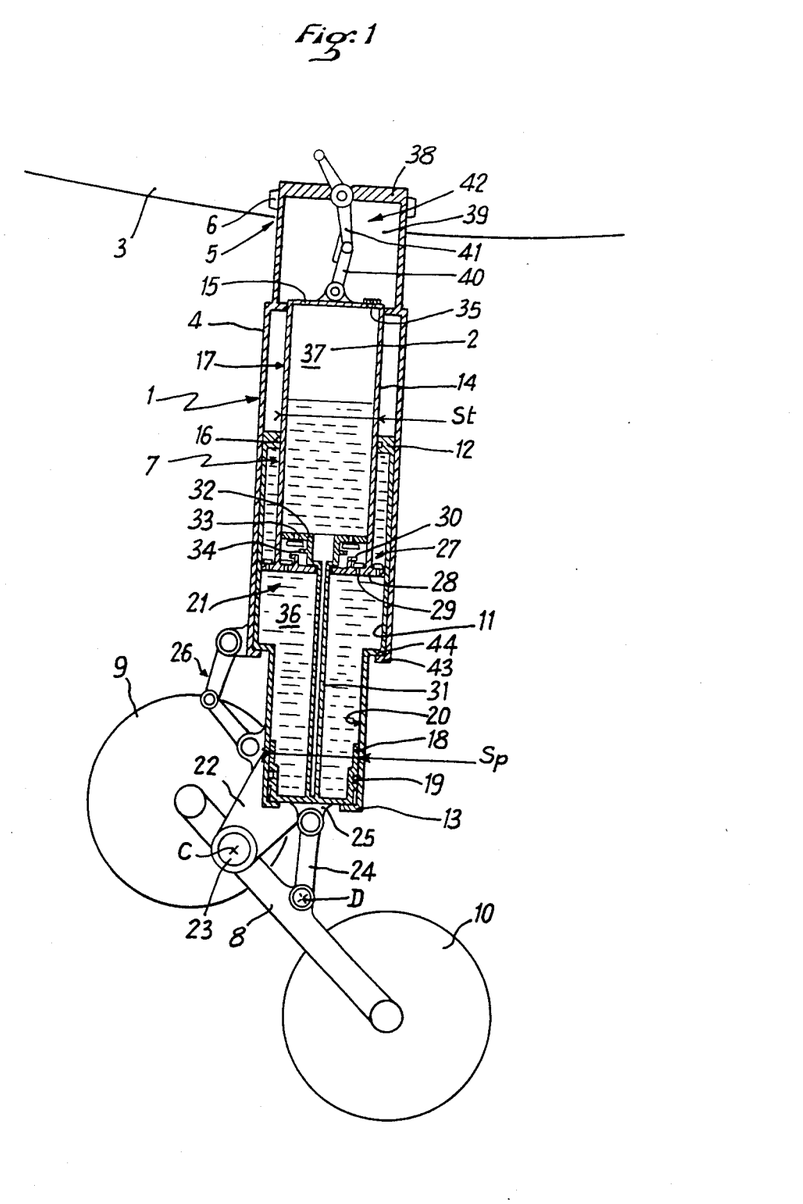
FIG. 1 is a longitudinal section of the undercarriage in accordance with the invention in accordance with a preferred first embodiment, in the "undercarriage lowered" position, the front and rear means of rolling being represented only diagrammatically.

FIGS. 1 to 4 represent the same undercarriage in different positions. In FIG. 1 this undercarriage 1 having the longitudinal axis 2 is associated with an aircraft 3 represented by a portion of its structure.

The undercarriage comprises a casing 4 one end 5 of which is mounted to pivot on the structure of the aircraft 3 by means of attachment 6 known in themselves. This casing 4 contains partially shock absorber means 7 which have a bottom end projecting below this casing with respect to the aircraft. At this bottom end is hinged a beam 8 equipped at one front end with front means of rolling 9 and at its rear end with rear means of rolling 10.

The shock absorber means 7 consist of a hollow cylinder 11 contained partially in the direction of its length inside the casing, a first end 12 being inside the casing and a second end 13 outside the said casing.

A hollow plunger stem 14 of cross-section St terminating in a wall 15 passes through the first end 12; the latter slides by a seal 16 over the outer face 17 of cross-section St of the plunger stem 14.

The second end 13 of the hollow cylinder 11 contains a piston 18 of cross-section Sp equipped with a seal 19 which is suited to sliding in a sealed manner along the inner face 20 of the hollow cylinder 11.

The hollow cylinder 11 between its first sealed end 12 and the piston 18 and the plunger stem 14 by its wall 15 define a closed chamber 21 which is variable as a function of the displacements of the plunger stem and of the piston.

Figure 5:
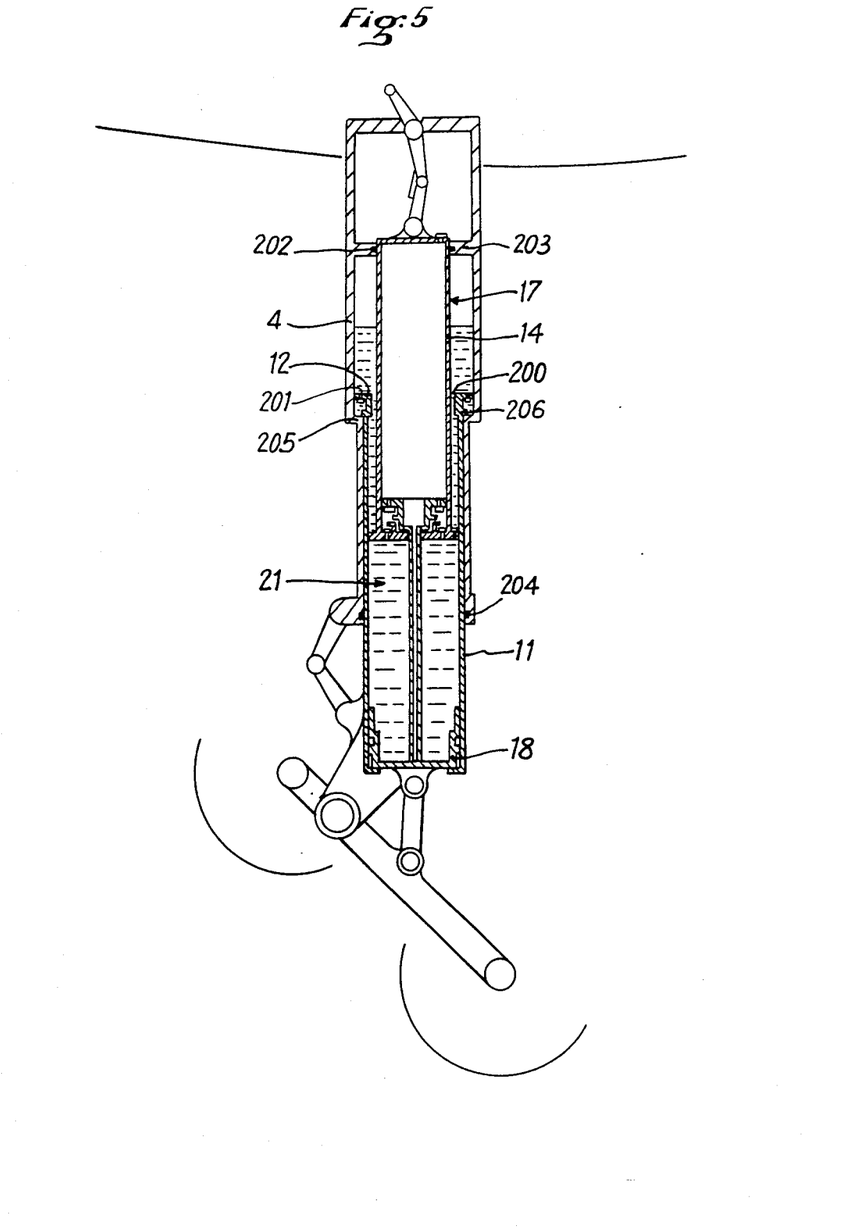
FIG. 5 is a view of a variant upon the preferred first embodiment of the undercarriage.

It will be noted that the closed chamber 21 may also be defined by the piston 18, the plunger stem 14, the hollow cylinder 11 and one portion of the casing 4 (FIG. 5); in this variant of this first preferred embodiment the end 12 of the hollow cylinder 11 no longer cooperates in a sealed manner with the outer face 17 of the plunger stem 14. This end 12 has an opening 200 and is equipped with means of throttling 201 acting at the time of the expansion of the shock absorber means as is well known. The sealing is then ensured firstly by a seal 202 arranged on a portion 203 of the casing 4 in contact with the outer face 17 of the plunger stem 14 and secondly by a seal 204 arranged on the lower portion of the casing 4. The hollow cylinder 11 is held longitudinally by, for example, a shoulder 205 on the casing 4 which cooperates with a stop 206 realised on the hollow cylinder.

The hollow cylinder 11 at the second end 13 is provided with a hinge member 22 such as a crosshead; the latter extends towards the front and beyond the end 13 in the direction 2 longitudinal to the undercarriage.

The beam 8 is hinged to the crosshead 22 by means of a hingepin 23 situated at a point C located between the centre of this beam and the front means of rolling 9.

The position of the point C enables the pivoting of the beam 8 as far as a position in which it is substantially perpendicular to the longitudinal axis 2 of the undercarriage.

A connecting-rod 24 is hinged on the one hand to the beam 8 at a point D differing from the point of hinge C and on the other hand to the piston 18 on to a boss 25 realised on the said piston.

The position of the point of hinge of the beam is a function of the increase in the length of the undercarriage which is desired at the time of the elevated position of the aircraft.

By way of example, by fixing the point of hinge C at a distance x=0.5 m from the centre of the beam, an increase in the length of the undercarriage is obtained in the "lowered position", of 1.2 m with respect to a beam hinged at its centre.

The determination will be explained in detail later, of the position of the point of hinge D of the connecting-rod which enables an identical force to be obtained on the front and rear means of rolling.

A calliper linkage 26 connects the casing 4 to the hollow cylinder 11 in order to control the rotation of the hollow cylinder about the longitudinal axis 2.

There will now be described in greater detail the shock absorber means 7. The plunger stem 14 has an end 27 terminating in a diaphragm 28 equipped with means of throttling 29 and with a stop 30 and suited to moving inside the chamber 21.

The piston 18 has a rod 31 which passes through the diaphragm 28; this rod terminates in a diaphragm 32 which is suited to sliding inside the plunger stem 14 and which carries means of throttling and a stop 34.

The wall 15 of the plunger stem 14 has an orifice 35 enabling the chamber 21 to be filled with an incompressible fluid such as oil to define a volume 36 and a compressible fluid such as a gas to define a volume 37.

As a function of the displacements of the piston and of the hollow cylinder, the means of throttling 29, 33 ensure the shock absorbing function by throttling the incompressible fluid. The latter cooperates with the compressible fluid in order to ensure the elastic function of the shock absorber means 7.

The means of throttling and the putting of them to use are not described more fully because they form part of the knowledge of one skilled in the art.

The plunger stem 14 is held in the casing by a retractor member enabling it to be made to rise towards the head 38 of the casing 4 and inside the inner compartment 39 of the inner casing 4; the member consists, for example, of a unit comprising connecting rod 40 and lever 41. The latter is mounted to pivot by the middle portion of it with respect to the head 38 through which it passes; it is connected to the structure of the aircraft by means of raising known in itself but not shown, such, for example, as a jack or an elastic linkage. The connecting rod-lever unit and the means of raising will be called below the means of retraction 42.

The piston 18 is held inside the hollow cylinder 11 by the end 13 of the hollow cylinder which provides the clearance necessary for the connecting-rod 24. The shock absorber means 7 define directly, in particular by the cross-sections of the stem 14 and of the piston 18, the position of the point of hinge D of the connecting rod 24 on to the beam. Thus in order to obtain an identical force upon the front means of rolling 9 as upon the rear 10, one must have:

$$F1 \cdot x = F2 \cdot y;$$

where
- F1: force at the point of hinge C of the beam 8;
- F2: force at the point of hinge D of the connecting-rod 24;
- x: distance between the point of hinge C of the beam and the centre O of the beam;
- y: distance between the point of hinge "C" of the connecting-rod 24 and the centre O of the beam.

However:

$$F1 = (St - Sp) \cdot P;$$

$$F2 = Sp \cdot P;$$

where P=internal pressure of inflation in the volume 37; whence $y = ((St - Sp)/Sp) \cdot x = ((St/Sp) - 1) \cdot x$.

The position x of the point of hinge C of the beam being fixed, the position y of the point of hinge D of the piston depends upon (St/Sp−1), namely, the relative cross-sections of the piston 18 and of the stem 14.

In practice the three relative values are reduced to a first embodiment with St>Sp, and to a second embodiment with St≦Sp. Each embodiment secures advantages suited to the conditions of use of the undercarriage, and these advantages will be explained during the description of operation of the undercarriage.

FIG. 1 represents the first embodiment, the cross-section St having a value greater than the cross-section Sp; the hollow cylinder 11 is held, for example, inside the casing 4 by a stop 43 realised on the casing 4 which cooperates with a shoulder 44 on the hollow cylinder.

The undercarriage in accordance with the first embodiment operates as follows. In accordance with FIG. 1, the undercarriage is in the "down" position; the shock absorber means 7 are in the extended position under the effect of the weight of the means of rolling and of the beam and the pressure inside the shock absorber means. The hollow cylinder 11 is in contact with the stop 43 on the casing 4 and the piston 18 is in contact with the end 13 of the hollow cylinder 11. At the time of touch-down (FIG. 2) the aircraft makes contact with the ground by its rear means of rolling 10. The beam 8 pivots about its point of hinge C; the connecting rod 24 driven by this pivoting movement forces the piston 18 inside the hollow cylinder 11, the incompressible fluid being throttled by the means of throttling 29, 33 in order to come and compress the compressible fluid.

Figure 7:
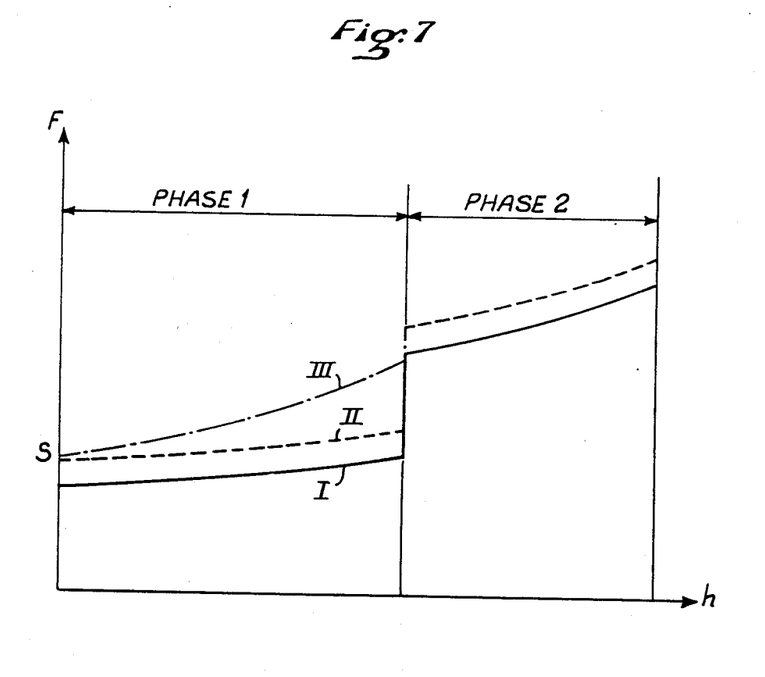
FIG. 7 is a graph showing as the ordinate the force F applied to the centre of the means of rolling as a function of their travel h plotted as the abscissa.
Figure 8:
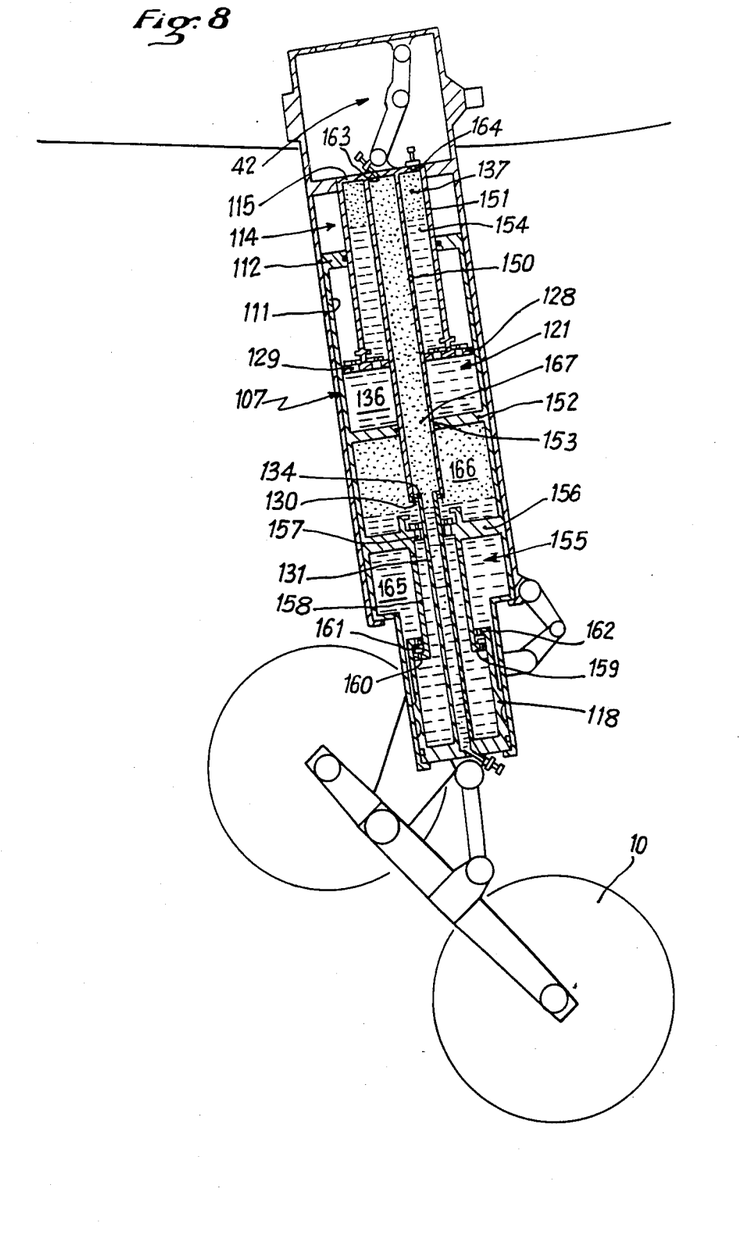
FIG. 8 is a section similar to FIG. 1 of a variant embodiment of the shock absorber means, the undercarriage being represented in the "undercarriage lowered" position.

Only the piston 18 is working. The undercarriage is operating in accordance with the lever mode. The curve I of the phase 1 of the graph in FIG. 7 represents the forces acting upon the rear means of rolling 10 (as ordinate) which alone is in contact with the ground, as a function of its travel (as abscissa).

Figure 2:
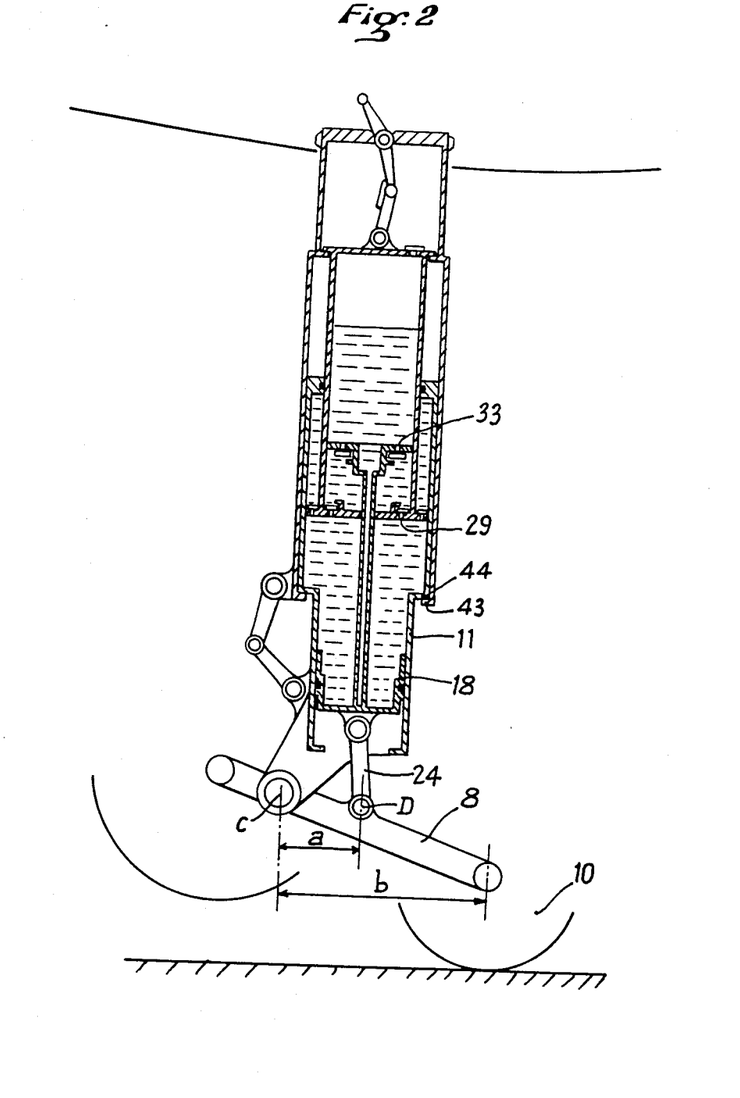
FIG. 2 is a view of the undercarriage in accordance with the preferred first embodiment in contact with the ground by its rear means of rolling.

This force is equal to:

$$F = Sp \cdot P \cdot b/a;$$

where:
a: distance along an axis perpendicular to the longitudinal axis of the undercarriage between the point of hinge C of the beam and the point of hinge D of the connecting-rod 24 connected to the piston 18 (FIG. 2);
b: distance along an axis perpendicular to the longitudinal axis of the undercarriage between the point C and the centre of the rear means of rolling 10.

This phase 1 corresponds with operation in the lever mode. During this phase, the cross-section St having a value greater than the cross-section Sp, the hollow cylinder is subjected to a force which applies it against the stop 43 of the casing 4; the total force applying the hollow cylinder against its stop 43 corresponds with the pressure in the air chamber multiplied by the difference between the cross-sections St and Sp to which is added the force at "C" which balances the other two forces acting upon the beam at the level of the rear means of rolling and of the connecting rod 24.

Figure 3:
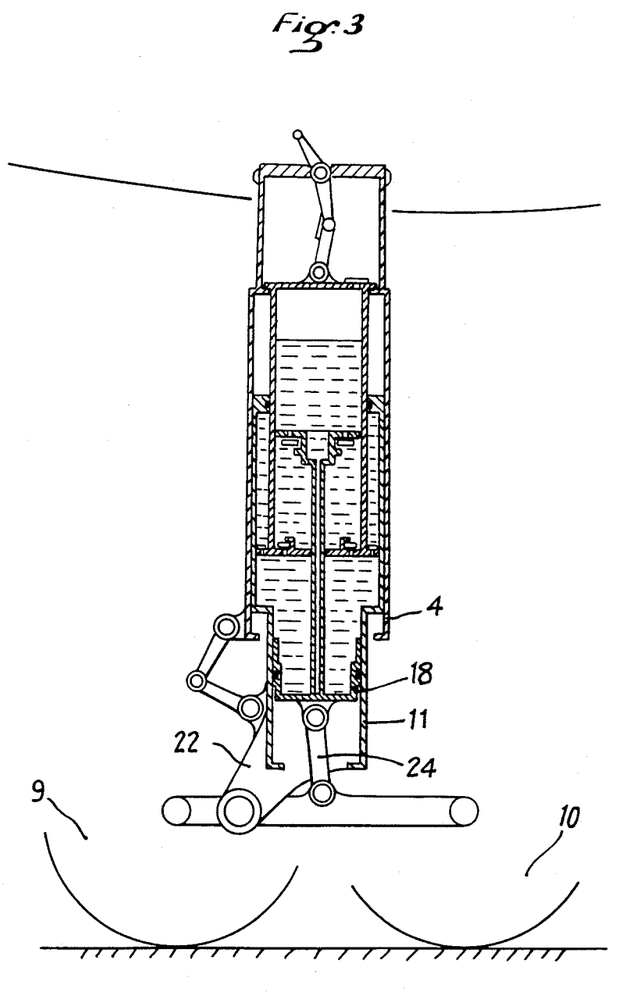
FIG. 3 is a view of the undercarriage in accordance with the preferred first embodiment in contact with the ground by its front and rear means of rolling.
Figure 4:
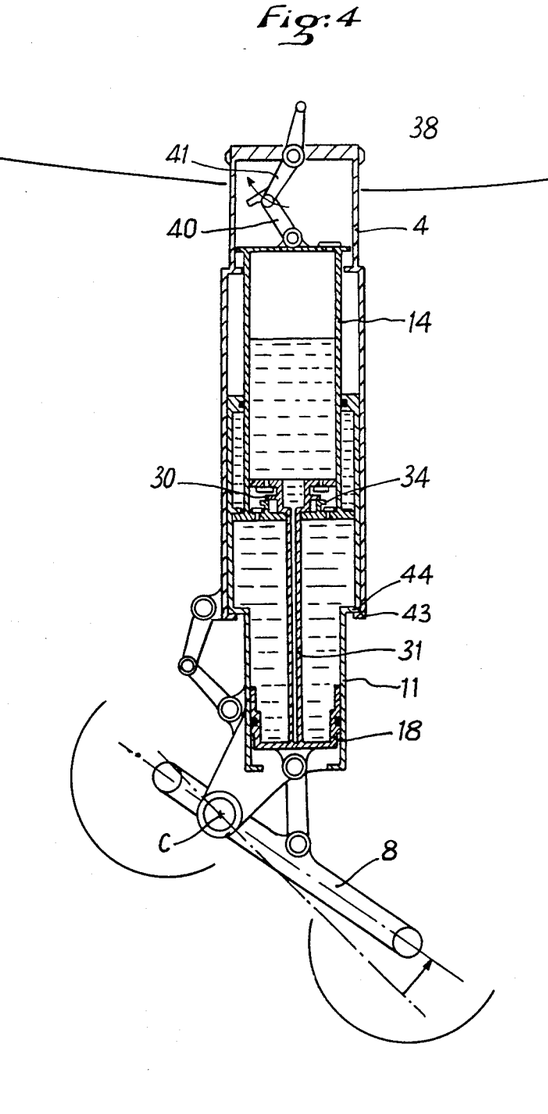
FIG. 4 is a view of the undercarriage in accordance with the preferred first embodiment in the time of its retraction, during raising.

In accordance with FIG. 3, the aircraft has come to bear upon the ground by its front and rear means of rolling 9, 10. The crosshead 22 acting directly upon the hollow cylinder 11 makes it slide with respect to the casing 4, and the undercarriage is operating in accordance the direct mode. The force F in the shock absorber means brought to the centre of the means of rolling 9 and 10 corresponds with phase 2 of the curve I in FIG. 7, namely:

$$F = St \cdot P.$$

The piston 18 no longer intervenes except as a pitch shock absorber for controlling the pivoting movements of the beam caused by the pitching movements of the aircraft or by the unevennesses of the ground during taxiing. Of course, during the course of take-off the reverse operations are carried out and they will not be described because they obviously proceed from those described above.

In order to raise the undercarriage (FIG. 4) the means of raising are acted upon in order to break the alignment of the unit comprising the connecting rod 40 and the lever 41; the plunger stem 14 then rises towards the base 38 of the casing 4 and the stop 30 on the plunger stem comes into contact with the stop 34 on the rod 31 of the piston 8. The plunger stem 14 and the rod 31 of the piston form one rigid unit which makes the beam 8 pivot about its point of hinge C in order that the means of rolling shall have a reduced bulk inside the aircraft.

During this retraction the hollow cylinder 11 is held against the stop 43 of the casing 4 by a force corresponding with the pressure of the compressible fluid multiplied by the difference between the cross-sections Sp and St.

The variant upon the first embodiment has a principle of operation absolutely identical with that of the first embodiment.

Figure 6:
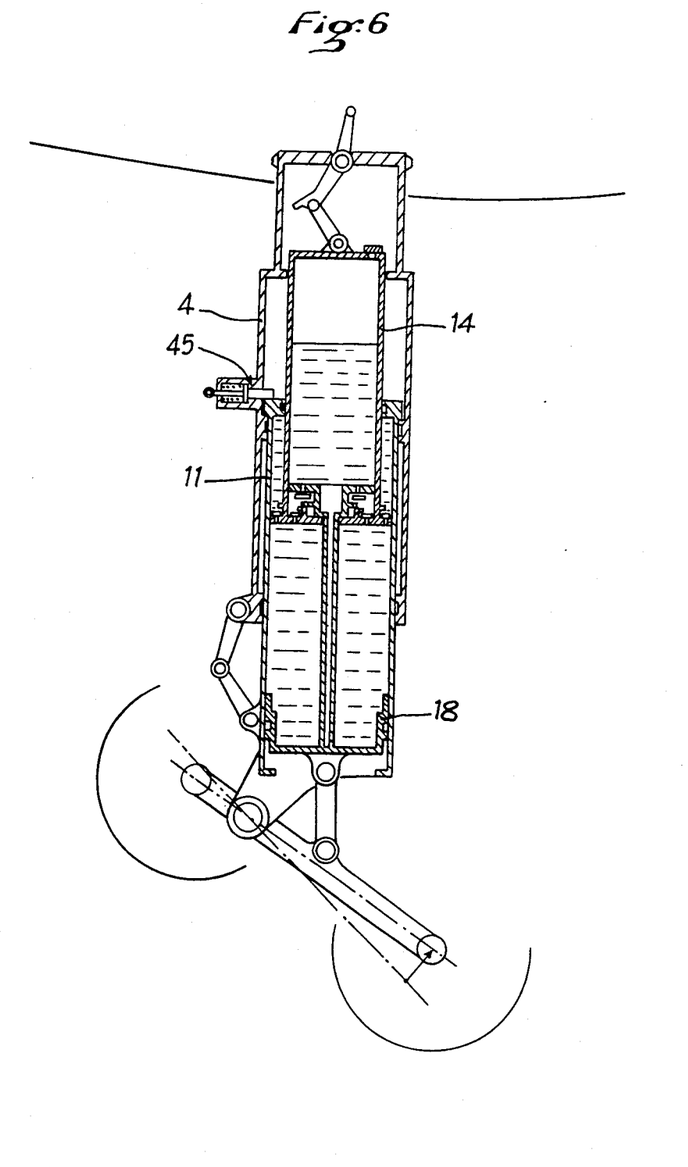
FIG. 6 is a view of a second preferred embodiment of the undercarriage.

It will be understood that if the cross-section Sp of the piston is greater than or equal to the cross-section of the stem St, the hollow cylinder 11 is no longer held at a stop against the casing 4 and consequently adopts a random position during the raising of the undercarriage. As the length of the undercarriage must be determined in a precise fashion in order to define the housing of the undercarriage inside the aircraft the hollow cylinder 11 is blocked longitudinally during raising by a retractable stop 45 as shown diagrammatically in FIG. 6. This stop 45 is retracted at the time of touch-down in order that the hollow cylinder may slide freely inside the casing 4.

A control circuit which is not shown operates the stop 45, the action and construction of which are well known.

This second embodiment of the undercarriage with the cross-section Sp of the piston having a value greater than or equal to the cross-section St of the plunger stem has the effect of raising the curve I in its phase 1 (FIG. 7); the new curve II has a static threshold force S increased with respect to the curve I because of the increase in the cross-section of the piston Sp.

A jog will be observed between phase 1 and phase 2 of the curve due to the passing from the lever mode to the direct mode (as the ratio b/a disappears). This jog is not inconvenient in itself because it does not disturb the phenomenon of absorption of energy.

However, if it proves necessary to increase the force at the end of the lever mode of operation (at the end of the curve corresponding with phase 1, cf. the curve III) in order to make the extension of the main undercarriages an optimum and consequently to favour the take-off phase of the aircraft, a second variant embodiment of the shock absorber means having two independent chambers of compressible fluid enable this result to be arrived at.

In this second variant the means will not be described which remain unchanged with respect to the first and second embodiments; the means modified from the first and second embodiments are designated by a supplementary prefix 1.

The shock absorber means 107 (FIG. 7) comprise a hollow cylinder 111 entered at a first end 112 by a plunger stem 114 and at a second end by a piston 118 of cross-section Sp.

The plunger stem 114 consists of a first tube 150 and a second tube 151 of cross-section St greater than the cross-section of the first tube; the two tubes are mounted in one another and joined by a base 115 connected to means of retraction 42 already described.

Through an opening 167 the tube 150 passes through one wall 152 of the hollow cylinder 111; the opening 167 is equipped with a seal 153 in contact with the outside of the tube 150.

The hollow cylinder 111 between its first sealed end 112 and the wall 152 and the annular space 154 between the two tubes define a first closed chamber 121 which is variable as a function of the displacements of the hollow cylinder 111.

The tube 151 carries a diaphragm 128 equipped with first means of throttling 129 and suited to sliding inside the hollow cylinder 111.

The wall 152, the hollow cylinder 111 and the piston 118 define a second closed chamber 155 which is variable in dependence upon the displacements of the piston 118 and independent of the first chamber 121.

A diaphragm 156 of the hollow cylinder 111 and equipped with second means of throttling 157 is realised inside the second chamber 155.

The piston 118 has a rod 131 terminating in a stop 134 which is suited to cooperating with a stop 130 on the tube of smaller cross-section in order to make the rear means of rolling 10 rise during the retraction.

The diaphragm 156 carries a hollow tube 158 which extends round the rod 131; this hollow tube has a portion 159 directed towards the outside, equipped with means of throttling 160 which act at the time of the expansion of the shock absorber means and cooperate with an expansion chamber 161 defined between the hollow tube 158 and one portion 162 of the piston extending round the hollow tube.

The base 115 of the plunger stem carries orifices 163, 164 which open respectively into the interior of the tube of smaller cross-section and of the tube of cross-section St.

The orifices 164, 163 enable the chambers 121, 155 respectively to be filled with an incompressible fluid which defines respective volumes 136, 165 and with a compressible fluid which defines respective volumes 137, 166.

We claim:

1. An undercarriage having a longitudinal axis for an aircraft, comprising a casing which is connected to the structure of the aircraft and inside which are arranged a shock absorber means having one end to which is hinged a beam equipped at each of its ends with rolling means, the shock absorber means including:
   a hollow cylinder slidable inside the casing by a first end and projecting by a second end;
   a plunger stem of a first cross-section slidable at the first end of the hollow cylinder;
   a piston of a second cross-section slidable at the second end of the hollow cylinder, so that the latter, the plunger stem, the piston and the casing define at least one closed chamber which is variable as a function of the displacement of the hollow cylinder and of the piston, this chamber having at least one volume of compressible fluid cooperating with at least one respective volume of incompressible fluid, means of throttling being arranged inside the chamber whilst the second end of the hollow cylinder is provided with a hinge member comprising a hingepin at a point situated in front of and beyond the said second end, this pin serving for the hingeing of the beam at a point differing from its centre, the beam being connected to the piston by a connecting-rod hinged firstly to the said piston and secondly to the beam at a point differing from the point of hinge.

2. An undercarriage according to claim 1, wherein the second cross-section of the piston is less than the value of the first cross-section of the plunger stem.

3. An undercarriage according to claim 1, wherein the value of the second cross-section of the piston is greater than or equal to the first cross-section of the plunger stem and the hollow cylinder is held along the longitudinal axis by a retractable stop at the time of retraction of the undercarriage.

4. An undercarriage according to claim 1, wherein the piston, the plunger stem and the hollow cylinder define a closed chamber, the plunger stem having a first end connected to means of retraction and a second end with a stop and a diaphragm equipped with means of throttling suited to sliding inside the hollow cylinder, the piston having a rod terminating in a diaphragm equipped with means of throttling and a stop, the latter being adapted to cooperate with the stop at the time of raising of the undercarriage by the means of retraction.

5. An undercarriage according to claim 4, wherein the plunger stem has a filler orifice.

6. An undercarriage according to claim 1, wherein the piston, the hollow cylinder and the plunger stem define a first closed chamber and a second closed chamber, the plunger stem comprising a first tube and a second tube of different cross-sections mounted in one another and joined by a base connected to means of retraction, the tube of smaller cross-section passing in a sealed manner through one wall of the hollow cylinder, the annular gap between the first tube and the second, and the gap between the first end of the hollow cylinder and the wall defining the first chamber, the tube of larger cross-section of the first cross-section carrying a diaphragm equipped with first means of throttling suited to sliding inside the first chamber, the second chamber being defined between the wall and the piston, the latter having a rod passing through a diaphragm in the hollow cylinder, equipped with second means of throttling, the said rod terminating in a stop adapted to cooperate with a stop on the tube of smaller cross-section at the time of raising the undercarriage by the means of retraction.

7. An undercarriage according to claim 6, wherein the base of the plunger stem has filler orifices opening into the interior of the first tube and the second tube.

8. An undercarriage according to claim 1, wherein the piston, the hollow cylinder, the plunger stem and the casing define a closed chamber, the casing cooperating in a sealed manner by seals respectively with the plunger stem and the hollow cylinder, the latter having its bottom end equipped with an opening and means of throttling.

* * * * *